United States Patent
Kusano et al.

(10) Patent No.: US 11,438,703 B2
(45) Date of Patent: Sep. 6, 2022

(54) ULTRASONIC SENSOR ARRAY

(71) Applicant: QUALCOMM Incorporated, San Diego, CA (US)

(72) Inventors: Yuri Kusano, Davis, CA (US); Yipeng Lu, Davis, CA (US); Jessica Liu Strohmann, Cupertino, CA (US); Hrishikesh Vijaykumar Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 16/455,472

(22) Filed: Jun. 27, 2019

(65) Prior Publication Data
US 2020/0413202 A1 Dec. 31, 2020

(51) Int. Cl.
| | |
|---|---|
| *H04R 17/00* | (2006.01) |
| *H04R 31/00* | (2006.01) |
| *G06F 3/041* | (2006.01) |
| *G06F 3/043* | (2006.01) |
| *G06V 40/13* | (2022.01) |

(52) U.S. Cl.
CPC .............. *H04R 17/00* (2013.01); *H04R 31/00* (2013.01); *G06F 3/0412* (2013.01); *G06F 3/0436* (2013.01); *G06F 2203/04102* (2013.01); *G06V 40/1306* (2022.01)

(58) Field of Classification Search
CPC ....... H04R 17/00; H04R 31/00; G06F 3/0412; G06F 3/0436; G06F 2203/04102; G06V 40/1306; B06B 1/0611; B06B 1/0622; B06B 1/0292
See application file for complete search history.

(56) References Cited

U.S. PATENT DOCUMENTS

| 2014/0180103 | A1 | 6/2014 | Sinelnikov |
| 2014/0352440 | A1 | 12/2014 | Fennell et al. |
| 2017/0285877 | A1 | 10/2017 | Hinger |
| 2020/0413202 | A1* | 12/2020 | Kusano ................ B06B 1/0292 |
| 2021/0377670 | A1* | 12/2021 | Strohmann ............ H04R 17/02 |

FOREIGN PATENT DOCUMENTS

| CN | 111682045 A | * | 9/2020 | ........... G06K 9/0002 |
| WO | WO-2006053528 A1 | * | 5/2006 | ............. H04R 17/02 |
| WO | WO-2021242519 A1 | * | 12/2021 | ........... B06B 1/0692 |

OTHER PUBLICATIONS

International Search Report and Written Opinion—PCT/US2020/037200—ISAEPO—dated Sep. 25, 2020.

* cited by examiner

*Primary Examiner* — Daniel Pihulic
(74) *Attorney, Agent, or Firm* — QUALCOMM Incorporated (57) ABSTRACT

An ultrasonic sensor array includes a plurality of ultrasonic transducers, each transducer including a piezoelectric member. Each of the transducers includes an electret member, a receive (Rx) layer configured to exhibit a first d33 resonating mode coefficient and a transmit (Tx) layer configured to exhibit a second d33 resonating mode coefficient, the first coefficient being different from the second coefficient. The transducers are disposed on a flexible substrate.

29 Claims, 9 Drawing Sheets

ULTRASONIC SENSOR ARRAY

TECHNICAL FIELD

This disclosure relates to ultrasonic sensor arrays for biometric sensing, imaging, and/or touch recognition, more particularly to sensor arrays having ultrasonic transducers configured with a layer of electret material, a flexible substrate, and/or separate transmit and receive layers exhibiting different electromechanical hysteresis characteristics.

DESCRIPTION OF THE RELATED TECHNOLOGY

Ultrasonic sensor systems may use a transmitter to generate and send an ultrasonic wave through a transmissive medium and towards an object to be detected and/or imaged. The ultrasonic transmitter may be operatively coupled with an ultrasonic sensor array configured to detect portions of the ultrasonic wave that are reflected from the object. At each material interface encountered buy the ultrasonic pulse, a portion of the ultrasonic pulse may be reflected. In some implementations, an ultrasonic pulse may be produced by starting and stopping the transmitter during a short interval of time (e.g. less than 1 microsecond). An ultrasonic sensor system may include biometric sensors, such as fingerprint or handprint sensors, and/or other ultrasonic imaging applications.

Thin film piezoelectric acoustic transducers are attractive candidates for such applications including biometric sensors such as fingerprint sensors, touch and gesture detection devices, and ultrasonic imaging devices. The piezoelectric layer may convert vibrations caused by ultrasonic reflections into electrical output signals. In some implementations, the ultrasonic sensor system further includes a thin-film transistor (TFT) layer that may include an array of sensor pixel circuits that may, for example, amplify electrical output signals generated by the piezoelectric layer. The piezeoelectric layer may include one or more of lead zirconate titanate (PZT), single crystal lead magnesium niobate-lead titanate (PMN-PT), a PZT ceramic, polyvinylidene fluoride (PVDF), poly(vinylidenefluoride-co-trifluoroethylene) (PVDF-TrFE) and/or another PVDF copolymer.

In some applications, a two-dimensional array of a large number of transducer elements may be integrated with and disposed behind or "under" a platen (a "cover plate" or "cover glass") configured as a display screen with which the user interacts. The display screen, for example, may provide a user touch interface and/or be incorporated in a personal electronic device such as a mobile phone or tablet and may include multi-layer stacks of glass, plastic and/or adhesive layers.

At least for biometric sensing and touch and gesture detection, large area (e.g. greater than 10 square inches) arrays of sensors and/or flexible arrays are desirable. Such increased area sensor arrays may be desirable for portable devices such as mobile phones and tablets for example, particularly in applications where a physical button is to be avoided, for example. In the absence of the presently disclosed techniques, an increased area sensor array exhibits a higher capacitance and requires either increased Tx/Rx sensitivity, or (disadvantageously) a high-voltage (>100V) transmitter operable at 10 MHz or above. As a result, improved arrangements of piezoelectric transducers for such sensor arrays are desirable.

SUMMARY

The systems, methods and devices of this disclosure each have several innovative aspects, no single one of which is solely responsible for the desirable attributes disclosed herein.

One innovative aspect of the subject matter described in this disclosure relates to an ultrasonic sensor array including a plurality of ultrasonic transducers, each transducer including a piezoelectric member. Each of the transducers includes an electret member, a receive (Rx) layer configured to exhibit a first d33 resonating mode coefficient and a transmit (Tx) layer configured to exhibit a second d33 resonating mode coefficient, the first coefficient being different from the second coefficient. The transducers are disposed on a flexible substrate.

In some examples, the electret member may be composed of a flouropolymer.

In some examples, the Tx layer may include the piezoelectric member and the Rx layer includes the electret member.

In some examples, the first d33 resonating mode coefficient may be of opposite sign with respect to the second d33 resonating mode coefficient.

In some examples, the array may further include a flexible electronics layer, the electret member being configured to be flexible. In some examples, the flexible electronics layer may be a flexible organic light-emitting diode display.

In some examples, the piezoelectric member may be formed from a ferroelectric.

In some examples, the piezoelectric member may be formed from a copolymer.

In some examples, at least some of the plurality of transducers may be electrically connected in series.

In some examples, the array may have a surface area of 10 in.$^2$ or greater.

According to some implementations, a method of forming an ultrasonic transducer includes forming a receive (Rx) layer; forming a transmit (Tx) layer; and coupling the Rx layer with the Tx layer. The ultrasonic transducer is disposed on a flexible substrate and includes an electret member. The Rx layer is configured to exhibit a first d33 resonating mode coefficient and the Tx layer is configured to exhibit a second d33 resonating mode coefficient, the first coefficient being different from the second coefficient.

In some examples, the electret member may be composed of a fluoropolymer.

In some examples, the Tx layer may include a piezoelectric member. In some examples, the piezoelectric member may be formed from a ferroelectric. In some examples, the piezoelectric member may be formed from a copolymer.

In some examples, the first d33 coefficient may be of opposite sign with respect to the second d33 coefficient.

According to some implementations, an ultrasonic sensor array includes a plurality of ultrasonic transducers, each transducer including an electret member each of the transducers includes a piezoelectric member. Each of the transducers includes a receive (Rx) layer configured to exhibit a first d33 resonating mode coefficient and a transmit (Tx) layer configured to exhibit a second d33 resonating mode coefficient, the first coefficient being different from the second coefficient. The transducers are disposed on a flexible substrate.

In some examples, the electret member may be configured to be an acoustic transducer.

In some examples, the piezoelectric member may be composed of a ferroelectric.

In some examples, the piezoelectric member may be composed of a copolymer.

In some examples, the Tx layer includes the piezoelectric member and the Rx layer includes the electret member.

In some examples, the first d33 resonating mode coefficient is of opposite sign with respect to the second d33 resonating mode coefficient.

In some examples, the array may further comprise a flexible electronics layer, the electret member being configured to be flexible. In some examples, the flexible electronics layer may be a flexible organic light-emitting diode display.

In some examples, at least some of the plurality of transducers may be electrically connected in series.

In some examples, the array may have a surface area of 10 in.$^2$ or greater.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a millimeter band communications capability. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Figure 1A:
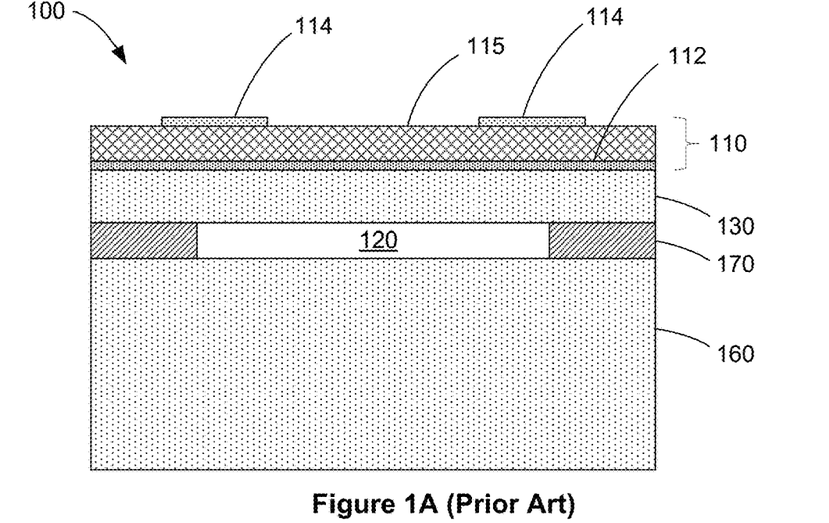
FIGS. 1A-1B illustrate an example of a piezoelectric ultrasonic transducer.

Referring to FIG. 1A, a conventional piezoelectric ultrasonic transducer 100 may be configured such that it includes a piezoelectric layer stack 110 and a mechanical layer 130 disposed so as to form a diaphragm (which may be referred to hereinbelow as a "PMUT diaphragm" or "deformable diaphragm") supported by an anchor structure 170 over a cavity 120. The piezoelectric layer stack 110 includes a piezoelectric layer 115, a lower electrode 112 and an upper electrode 114. In the illustrated implementation, the lower electrode 112 is disposed below the piezoelectric layer 115 and proximate to the cavity 120, whereas the upper electrode 114 is disposed above the piezoelectric layer 115, proximate to a surface of the piezoelectric layer 115 that is opposite to the cavity 120. The cavity 120 may be formed in or on a substrate 160. The substrate 160 may be or include, for example, a silicon wafer, a silicon-on-insulator (SOI) wafer, a silicon or SOI wafer with integrated circuitry, a semiconductor substrate, or a glass or polymer substrate with thin film transistor (TFT) circuitry. In some implementations, the substrate may be a flexible substrate such as a thin layer of polyimide (PI), polyethylene naphthalate (PEN) or polyethylene terephthalate (PET), or a flexible substrate with InGaZnO (IGZO) circuitry.

Figure 1B:
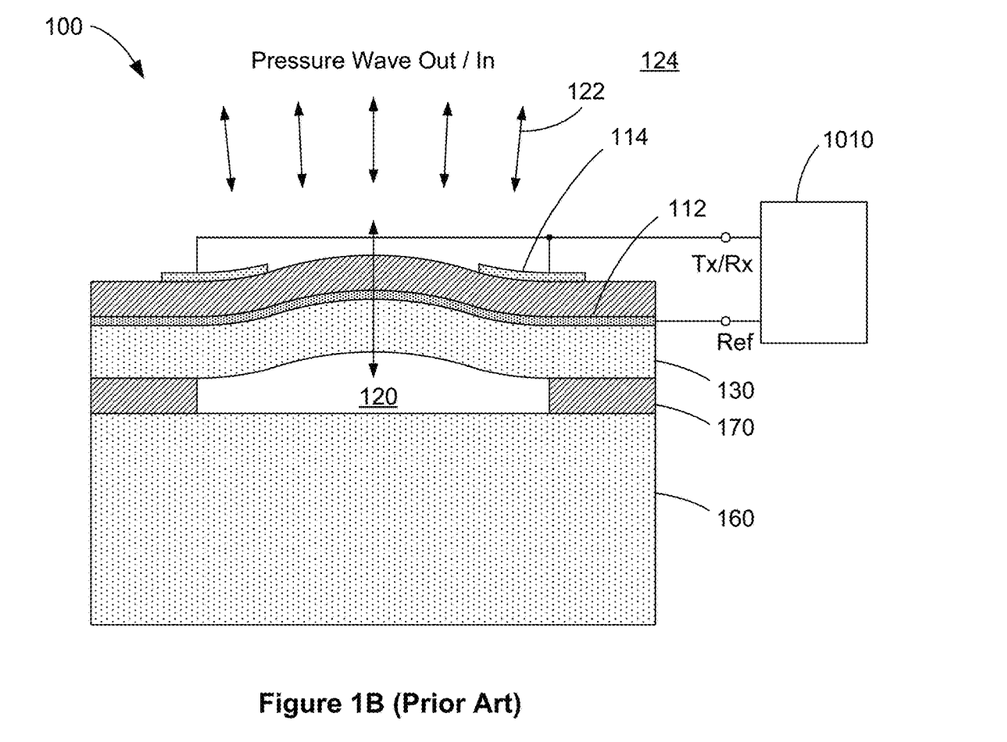

Referring now to FIG. 1B, during operation, the piezoelectric layer stack 110 and the mechanical layer 130 may be caused to bend and vibrate in response to a time-varying excitation voltage applied across the upper electrode 114 and the lower electrode 112 by transceiver circuitry 1010. As a result, one or more ultrasonic pressure waves 122 having frequencies in, for example, an ultrasonic frequency band, may be propagated into a propagation medium 124. In some implementations, the propagation medium 124 may include air, a platen, a cover glass, a device enclosure, or an acoustic coupling or matching layer. The piezoelectric layer stack 110 may likewise receive reflected ultrasonic pressure waves from an object in the propagation medium, and convert the received ultrasonic pressure waves into electrical signals that may be read by the transceiver circuitry 1010. The deformable diaphragm over the cavity 120 may bend and vibrate in response to the reflected ultrasonic pressure wave impinging on a surface of the PMUT, generating mechanical stresses and strains in the PMUT diaphragm and surface charge on the surfaces of the piezoelectric layer that may be detected by underlying circuitry. In some implementations, the lower electrode 112 (sometimes referred to herein as a reference electrode) may be grounded, connected to a constant bias voltage (e.g., a reference voltage), or connected to a multi-level bias signal such as a receiver bias voltage that may be provided by the transceiver circuitry 1010.

The PMUT array may be addressable for wavefront beam forming, beam steering, receive-side beam forming, and/or selective readout of returned signals. For example, individual columns, rows, sensor pixels and/or groups of sensor pixels may be separately addressable. A control system may control an array of transmitters to produce wavefronts of a particular shape, such as planar, circular or cylindrical wavefronts. The control system may control the magnitude and/or phase of the array of transmitters to produce constructive or destructive interference in desired locations. For example, the control system may control the magnitude and/or phase of the array of transmitters to produce constructive interference in one or more locations in which a touch or gesture has been detected or is likely to be detected.

In some implementations, PMUT devices may be co-fabricated with thin-film transistor (TFT) circuitry or CMOS circuitry on or in the same substrate, which may be a silicon, SOI, glass or plastic substrate, in some examples. The TFT substrate may include row and column addressing electronics, multiplexers, local amplification stages and control circuitry. In some implementations, an interface circuit including a driver stage and a sense stage may be used to excite a PMUT device and detect responses from the same device. In other implementations, a first PMUT device may serve as an acoustic or ultrasonic transmitter and a second PMUT device may serve as an acoustic or ultrasonic receiver. In some configurations, different PMUT devices may be capable of low- and high-frequency operation (e.g., for gestures and for fingerprint detection). In other configurations, the same PMUT device may be used for low- and high-frequency operation. In some implementations, the PMUT may be fabricated using a silicon wafer with active silicon circuits fabricated in the silicon wafer. The active silicon circuits may include electronics for the functioning of the PMUT or PMUT array.

Figure 2A:
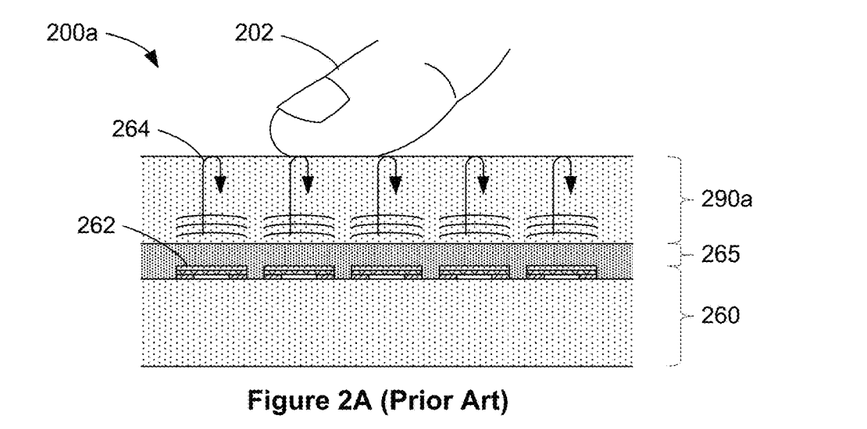
FIGS. 2A-2C illustrate cross-sectional views of various configurations of PMUT ultrasonic sensor arrays.
Figure 2B:
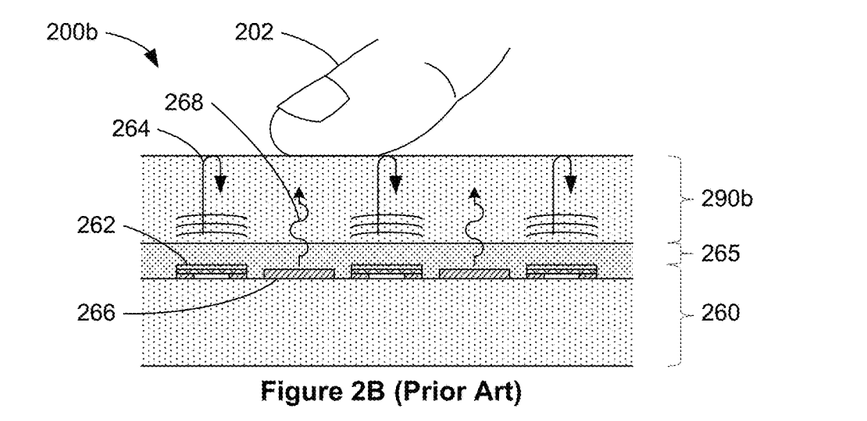
Figure 2C:
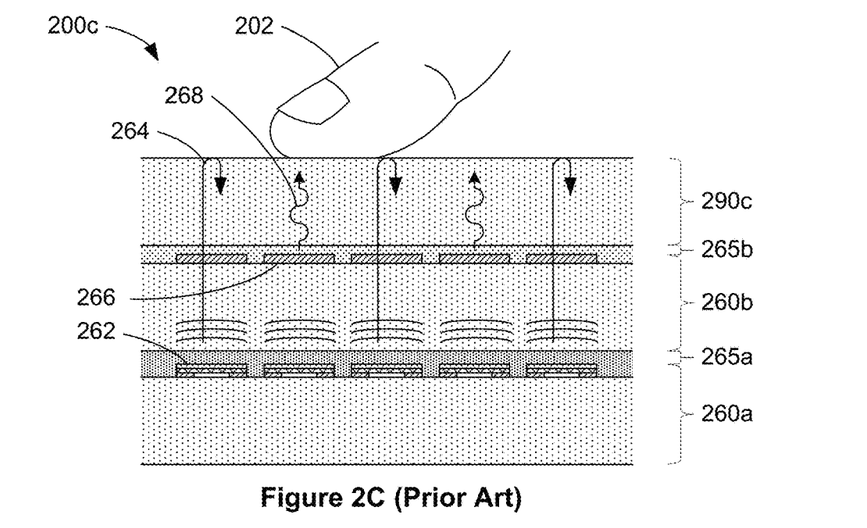

In some implementations, the PMUT array may be configured as an ultrasonic sensor array. FIGS. 2A-2C illustrate cross-sectional views of various configurations of conventional PMUT ultrasonic sensor arrays. FIG. 2A depicts an ultrasonic sensor array 200*a* with PMUTs as transmitting and receiving elements that may be used, for example, as an ultrasonic fingerprint sensor, an ultrasonic touchpad, or an ultrasonic imager. PMUT sensor elements 262 on a PMUT sensor array substrate 260 may emit and detect ultrasonic waves. As illustrated, an ultrasonic wave 264 may be transmitted from at least one PMUT sensor element 262. The ultrasonic wave 264 may travel through a propagation medium such as an acoustic coupling medium 265 and a platen 290*a* towards an object 202 such as a finger or a stylus positioned on an outer surface of the platen 290*a*. A portion of the ultrasonic wave 264 may be transmitted through the platen 290*a* and into the object 202, while a second portion is reflected from the surface of platen 290*a* back towards the sensor element 262. The amplitude of the reflected wave may depend in part on the acoustic properties of the object 202. The reflected wave may be detected by the sensor elements 262, from which an image of the object 202 may be acquired. For example, with sensor arrays having a pitch of about 50 microns (about 500 pixels per inch), ridges and valleys of a fingerprint may be detected. An acoustic coupling medium 265 such as an adhesive, gel, a compliant layer or other acoustic coupling material may be provided to improve coupling between an array of PMUT sensor elements 262 disposed on the sensor array substrate 260 and the platen 290*a*. The acoustic coupling medium 265 may aid in the transmission of ultrasonic waves to and from the sensor elements 262. The platen 290*a* may include, for example, a layer of glass, plastic, sapphire, metal, metal alloy, or other platen material. An acoustic impedance matching layer (not shown) may be disposed on an outer surface of the platen 290*a*. The platen 290*a* may include a coating (not shown) on the outer surface.

FIG. 2B depicts an ultrasonic sensor and display array 200*b* with PMUT sensor elements 262 and display pixels 266 co-fabricated on a sensor and display substrate 260. The sensor elements 262 and display pixels 266 may be collocated in each cell of an array of cells. In some implementations, the sensor element 262 and the display pixel 266 may be fabricated side-by-side within the same cell. In some implementations, part or all of the sensor element 262 may be fabricated above or below the display pixel 266. Platen 290*b* may be positioned over the sensor elements 262 and the display pixels 266 and may function as or include a cover lens or cover glass. The cover glass may include one or more layers of materials such as glass, plastic or sapphire, and may include provisions for a capacitive touchscreen. An acoustic impedance matching layer or coating (not shown) may be disposed on an outer surface of the platen 290*b*. Ultrasonic waves 264 may be transmitted and received from one or more sensor elements 262 to provide imaging capability for an object 202 such as a stylus or a finger placed on the platen 290*b*. The platen 290*b* is substantially transparent to allow optical light from the array of display pixels 266 to be viewed by a user through the platen 290*b*. The user may choose to touch a portion of the platen 290*b*, and that touch may be detected by the ultrasonic sensor array. Biometric information such as fingerprint information may be acquired, for example, when a user touches the surface of the platen 290*b*. An acoustic coupling medium 265 such as an adhesive, gel, or other acoustic coupling material may be provided to improve acoustic, optical and mechanical coupling between the sensor array substrate 260 and the cover glass. In some implementations, the coupling medium 265 may be a liquid crystal material that may serve as part of a liquid crystal display (LCD). In LCD implementations, a backlight (not shown) may be optically coupled to the sensor and display substrate 260. In some implementations, the display pixels 266 may be part of an active-matrix organic light-emitting diode (AMOLED) or OLED display with light-emitting display pixels. In some implementations, the ultrasonic sensor and display array 200b may be used for display purposes and for touch, stylus or fingerprint detection.

FIG. 2C depicts an ultrasonic sensor and display array 200c with a sensor array substrate 260a positioned behind a display array substrate 260b. An acoustic coupling medium 265a may be used to acoustically couple the sensor array substrate 260a to the display array substrate 260b. An optical and acoustic coupling medium 265b may be used to optically and acoustically couple the sensor array substrate 260a and the display array substrate 260b to a cover lens or cover glass 290c, which may also serve as a platen for the detection of fingerprints. An acoustic impedance matching layer or other coating (not shown) may be disposed on an outer surface of the cover glass 290c. Ultrasonic waves 264 transmitted from one or more sensor elements 262 may travel through the display array substrate 260b and cover glass 290c, reflect from an outer surface of the cover glass 290c, and travel back towards the sensor array substrate 260a where the reflected ultrasonic waves may be detected and image information acquired. In some implementations, the ultrasonic sensor and display array 200c may be used for providing visual information to a user and for touch, stylus or fingerprint detection from the user. Alternatively, a PMUT sensor array may be formed on the backside of the display array substrate 260b. Alternatively, the sensor array substrate 260a with a PMUT sensor array may be attached to the backside of the display array substrate 260b, with the backside of the sensor array substrate 260a attached directly to the backside of the display array substrate 260b, for example, with an adhesive layer or adhesive material (not shown).

The present disclosure mitigates problems arising from use of large area sensor arrays for biometric sensing and touch and gesture detection. Such increased area sensor arrays may be desirable for portable devices such as mobile phones and tablets for example, particularly in applications where a physical button is to be avoided, for example. In the absence of the presently disclosed techniques, an increased area sensor array exhibits a higher capacitance and requires either increased Tx/Rx sensitivity, or (disadvantageously) a high-voltage (>100V) transmitter operable at 10 MHz or above. As a result, improved arrangements of ultrasonic transducers for such sensor arrays are desirable. One such arrangement, disclosed hereinbelow, includes a hybrid piezoelectric-electret sensor with high sensitivity. In some implementations, an electret layer may be patterned so as to form an array of electret members. A further enhancement of receive sensitivity may be obtained by serially connecting two or more such electret members. In some implementations, the electret members may be formed from a flouropolymer such as polytetrafluoroethylene (PTFE) (e.g., Teflon™).

In addition, for some applications, flexible and/or wearable devices are desirable for more convenient human-devices interactions. To realize flexible and/or wearable devices, the sensor array may be configured with flexible layers, including the substrate, and while at least maintaining electromechanical coupling efficiency. In some implementations, accordingly, a flexible electret micro sensor array may be contemplated, together with flexible electronics.

Moreover, in some implementations, an electret material may be configured as a passive layer in an array of micromachined ultrasonic transducers. For example, a highly sensitive hybrid sensor structure is contemplated that includes a piezoelectric transmit layer and an electret receiver.

Finally, in some implementations, each transducer includes a receive layer exhibiting a first d33 resonating mode and a transmit layer exhibiting a second d33 resonating mode, the first d33 resonating mode being different from the second d33 resonating mode.

Figure 3:
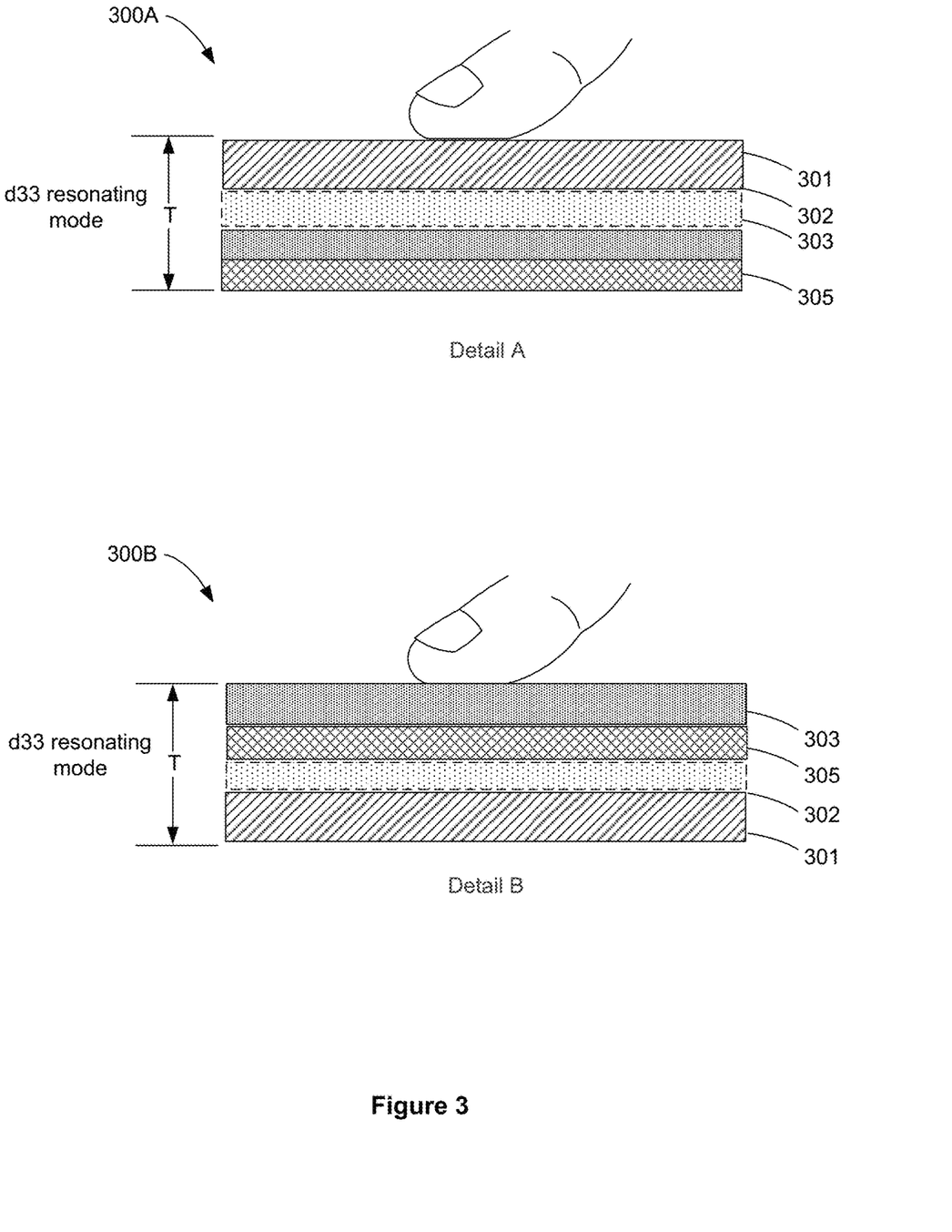
FIG. 3 illustrates simplified cross-sections of an ultrasonic transducer according to some implementations.

FIG. 3 illustrates simplified cross-sections of an ultrasonic transducer according to some implementations. In the illustrated implementations the ultrasonic transducers include stacked layers including a transmit (Tx) layer 301, a receive (Rx) layer 303, a thin film transistor (TFT) circuit substrate 305, and, optionally, one or more acoustic matching layers 302.

Referring first to Detail A, an ultrasonic transducer 300A includes, proximate to the outer surface of the sensor array, the Tx layer 301 disposed above the TFT circuit substrate 305. The Rx layer 303 is disposed between the Tx layer 301 and the TFT circuit substrate 305. Optionally, one or more acoustic matching layers 302 may be disposed between the Tx layer 301 and the Rx layer 303.

Referring now to Detail B, an ultrasonic transducer 300B includes, proximate to the outer surface of the sensor array, the Rx layer 303 disposed above the TFT circuit substrate 305. The TFT circuit substrate 305 is disposed between the Rx layer 303 and the Tx layer 301. Optionally, one or more acoustic matching layers 302 may be disposed between the Tx layer 301 and the TFT circuit substrate 305.

A "d33" resonating mode is illustrated in Detail A and Detail B. The d33 resonating mode refers to a mode of excitation, wherein an electrical signal applied in the vertical (Z) direction (across thickness "T") results in resonating oscillations in the same (i.e., Z) direction. Correspondingly, a d33 coefficient is a measure of frequency response characteristics related to dimension T of the resonator. The Tx layer 301 and the Rx layer 303 may each exhibit a respective characteristic d33 coefficient. Advantageously, the respective characteristic d33 coefficient of the Tx layer 301 may be different from the respective characteristic d33 coefficient of the Rx layer 303.

Figure 4:
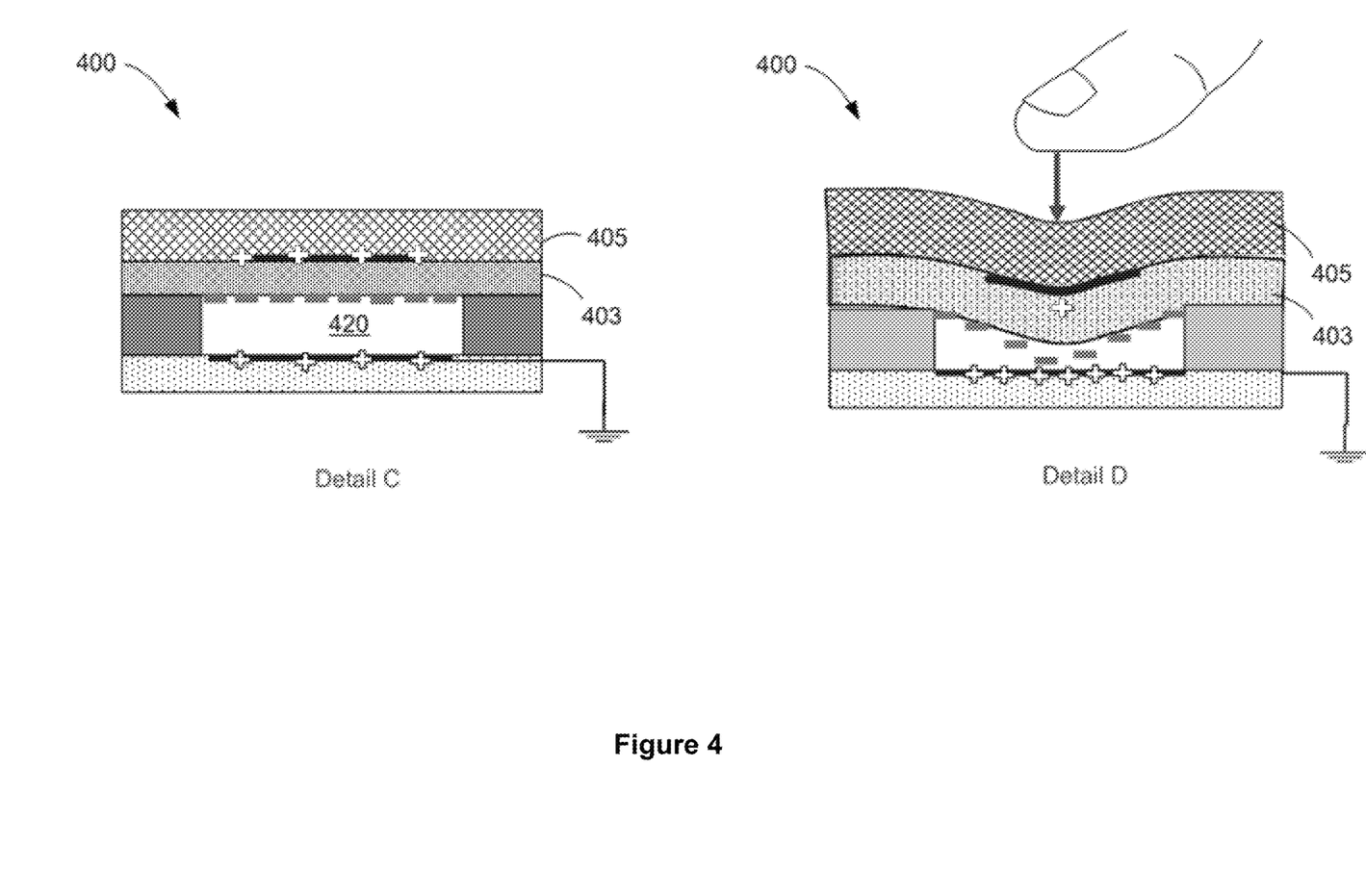
FIG. 4 illustrates a simplified cross-section of a touch sensor according to another implementation.

FIG. 4 illustrates a simplified cross-section of a touch sensor according to another implementation. In the illustrated implementation, the touch sensor 400 includes a flexible electronics layer 405, disposed above a cavity 420. A flexible electret member 403 is disposed between the flexible electronics layer 405 and the sealed cavity 420.

In the absence of pressure resulting from a touch, as illustrated in Detail C, the electret member 403 exhibits a nominal surface charge. Applied pressure (e.g., from a touch) may produce a change in the surface charge (Detail D). As a result, the electret member 403 may be configured as a touch sensor. In some implementations, the flexible electronics layer 405 may be a flexible organic light-emitting diode (OLED) display, for example. Advantageously, where both the electret member 403 and the electronics layer 405 are configured to be flexible, the touch sensor 400 may be, or may be included in, a wearable device. In some implementations, the electret member 403, or a second electret member (not illustrated) may also function as an acoustic transducer. In such implementations, a piezoelectric Tx layer may be omitted. The cavity 420 may, in some implementations, be evacuated. In other implementations the cavity 420 may be filled with air or an inert gas, or with a soft foam, for example.

The present inventors have appreciated that, relative to a piezoelectric member, an electret member may be expected to have a substantially higher d33 coefficient and a lower Tx figure of merit, particularly where the electret member is composed of PTFE or the like and the piezoelectric member is a copolymer or formed from compounds such as lead zirconate titanate (PZT), aluminum nitride (AlN) or zinc oxide (ZnO). As a result, a "hybrid" ultrasonic transducer in which the Rx layer includes an electret member and the Tx layer includes a piezoelectric member may be advantageous. More particularly, referring again to FIG. 3, the Tx layer 301 may advantageously be formed from a piezoelectric material, whereas the Rx layer 303 may advantageously be formed from an electret material.

Figure 5:
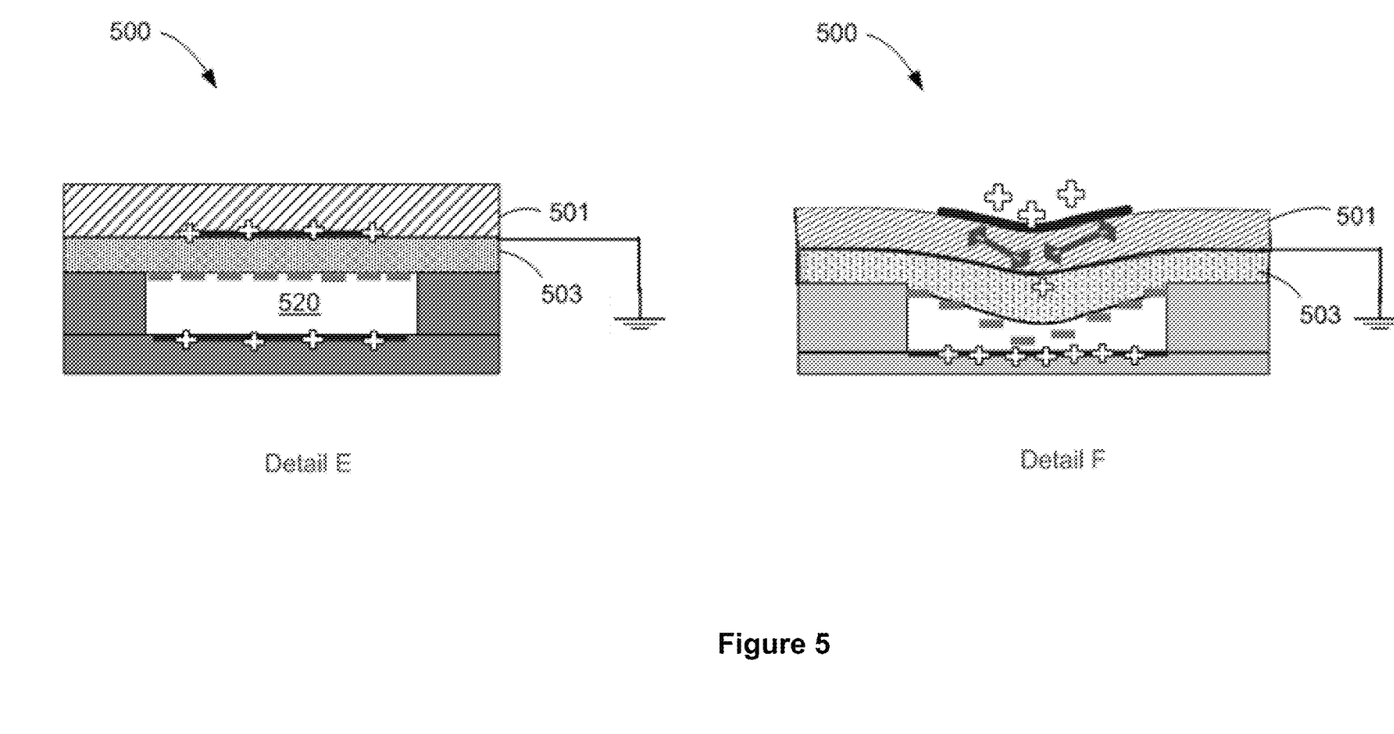
FIG. 5 illustrates a simplified cross-section of an ultrasonic sensor according to a yet further implementation.

FIG. 5 illustrates a simplified cross-section of an ultrasonic sensor according to a yet further implementation. In the illustrated implementation, an ultrasonic sensor 500 includes a Tx layer 501 including a piezoelectric member disposed over a cavity 520. An Rx layer 503, including an electret member, is disposed between the Tx layer 501 and the cavity 520. Advantageously, the Rx layer 503 also serves as a passive layer configured to improve electromechanical coupling efficiency of the Tx layer 501. Detail E depicts the ultrasonic sensor 500 in the absence of an external pressure or electrical excitation. Detail F depicts the ultrasonic sensor 500 during operation, such that the Tx layer 501 and the Rx layer 503 have been caused to bend and/or vibrate in response to an external pressure or a time-varying excitation voltage.

Figure 6:
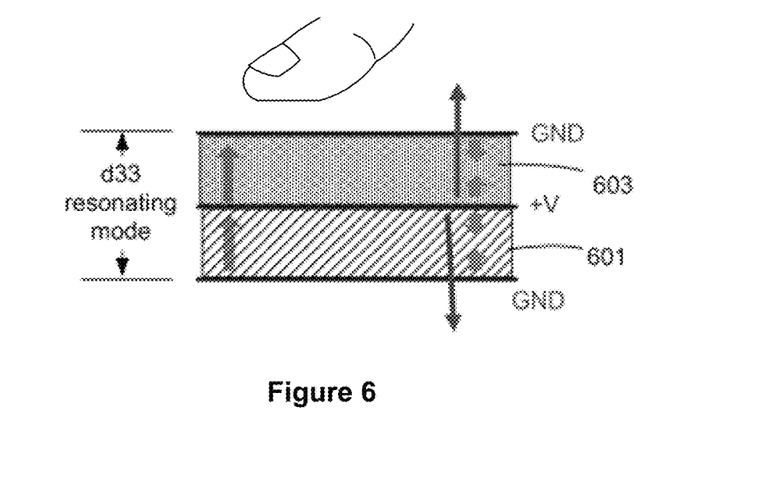
FIG. 6 illustrates a simplified cross-section of a hybrid ultrasonic transducer stack, according to some implementations.

In some implementations, a first coefficient d33 of the piezoelectric member has an opposite sign, after poling, than a second coefficient d33 of the electret member. FIG. 6 illustrates a simplified cross-section of a hybrid ultrasonic transducer stack, according to some implementations. In the illustrated implementation, an electret member 603 is disposed above a ferroelectric copolymer member 601. At least after poling, the electret member 603 may have a first characteristic d33 coefficient that is opposite in sign with respect to a second characteristic d33 coefficient of the copolymer member 603. More particularly, the first characteristic d33 coefficient may be positive (that is, at least for common electret materials like PZT, AlN, ZnO and cellular polymers, an increase in thickness increases dipole moment and, consequently, charge) whereas the second characteristic d33 may be negative (that is, for copolymers of polyvinylidene fluoride (PVDF) and the like, an increase in thickness decreases dipole moment and, consequently, charge). As a result, an improvement in differential Tx/Rx may be achieved.

Figure 7:
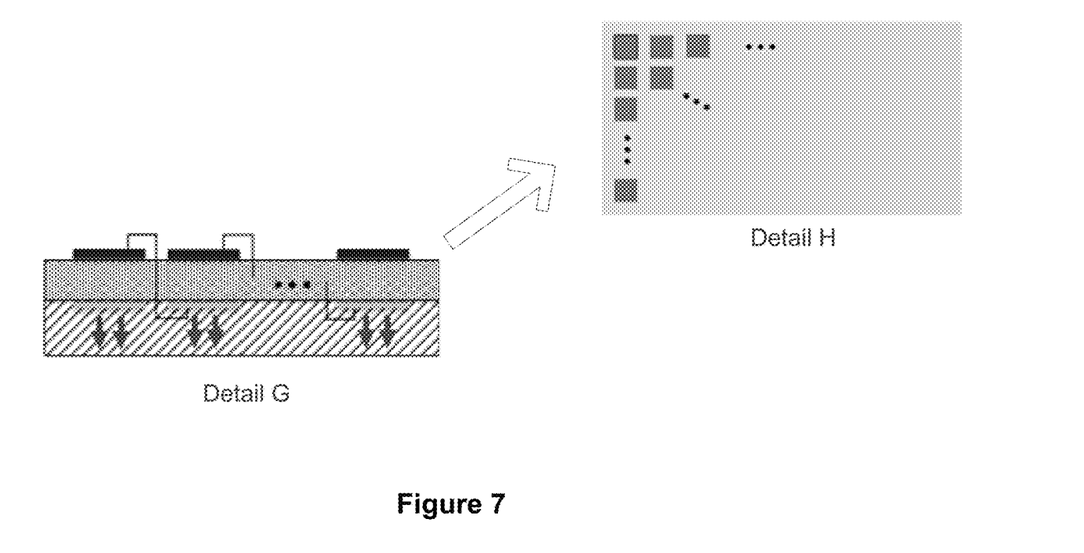
FIG. 7 illustrates an example of techniques for improving Rx sensitivity, according to some implementations.

FIG. 7 illustrates an example of techniques for improving Rx sensitivity, according to some implementations. In the illustrated example, respective clusters of pixels ("super pixels") forming part of a sensor array are connected in series. More particularly, in some implementations, an Rx layer and associated electrodes are patterned, as illustrated in Detail G, so as to form a serial connection between respective pixels in each super pixel. In such implementations, the sensor array, Detail H, may be regarded as an array of super pixels. For the illustrated implementation, the inventors have found that Rx sensitivity is improved because, for a given amount of charge Q, capacitance is reduced, resulting in improve electromechanical coupling.

Figure 8:
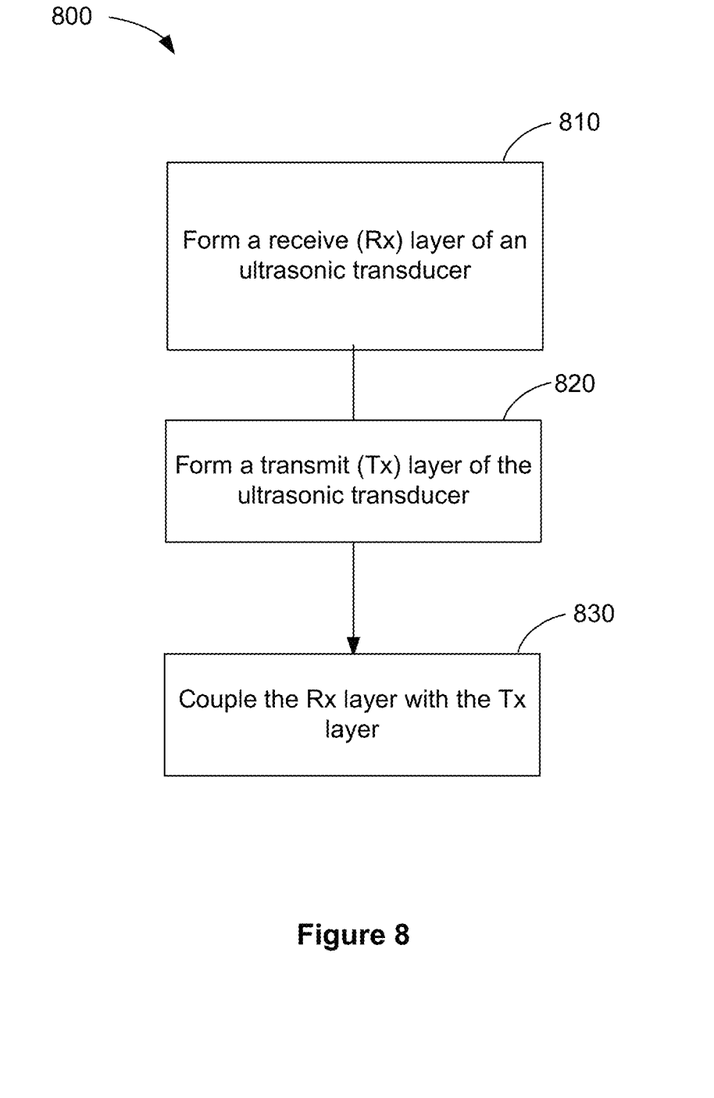
FIG. 8 illustrates an example of a process flow for fabricating an ultrasonic transducer.

FIG. 8 illustrates an example of a process flow for fabricating an ultrasonic transducer. As described hereinabove, the ultrasonic transducer may be included in an ultrasonic sensor array. Method 800 includes, block 810, forming an Rx layer of the ultrasonic transducer; in some implementations, the Rx layer may be or include an electret member. The method 800 may continue, at block 820, with forming a Tx layer for the ultrasonic transducer; the Tx layer may be or include a piezoelectric member. At block 830 the Rx layer may be coupled with the Tx layer. Advantageously, the Rx layer exhibits a first d33 resonating mode coefficient and the Tx layer exhibits a second d33 resonating mode coefficient, the first coefficient being different from the second coefficient.

Figure 9:
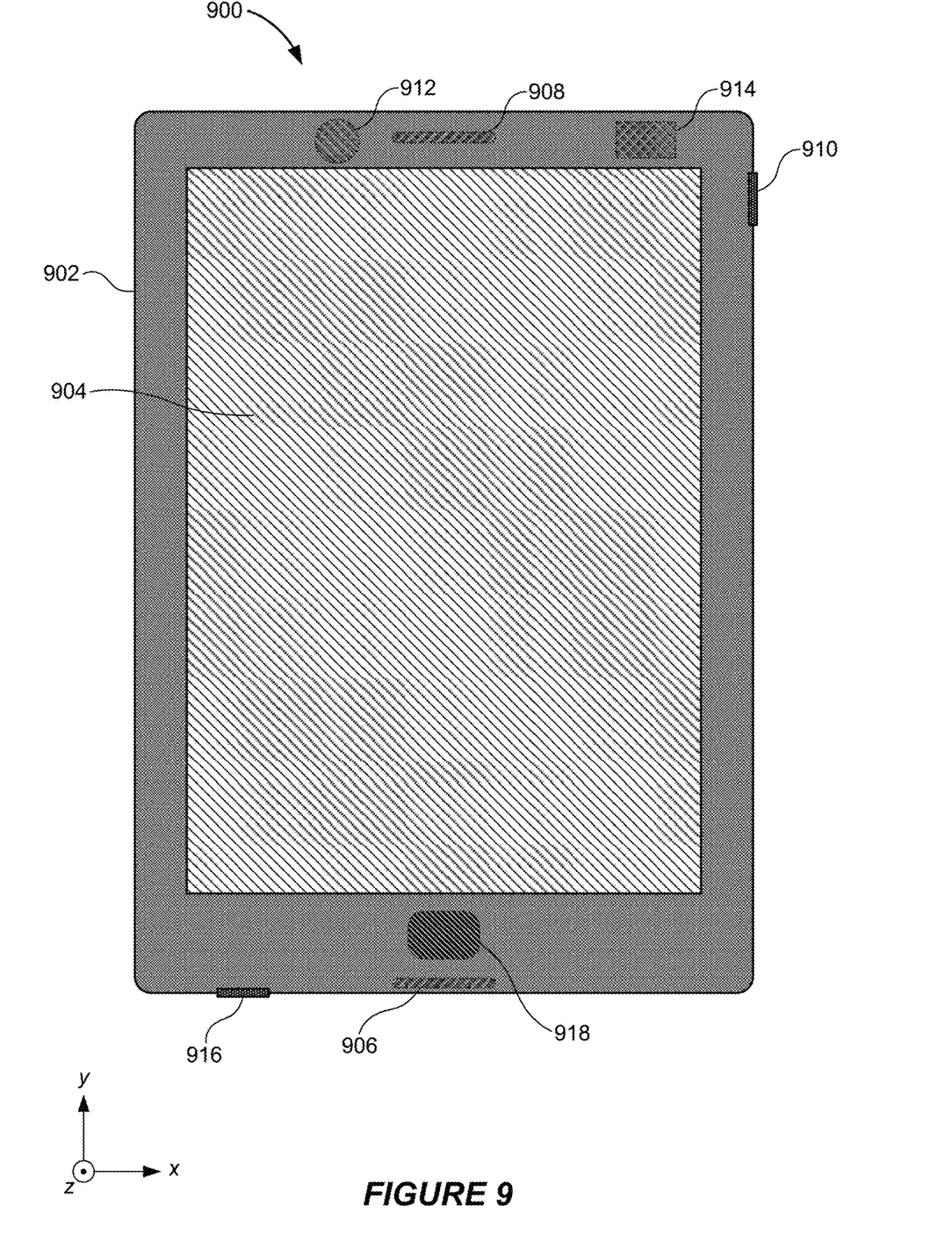
FIG. 9 shows a front view of a diagrammatic representation of an example of an electronic device that includes an ultrasonic sensing system according to some implementations.

The ultrasonic sensing arrays or systems described hereinabove may be included in a variety of electronic devices. FIG. 9 shows a front view of a diagrammatic representation of an example of an electronic device 900 that includes an ultrasonic sensing system according to some implementations. The electronic device 900 may be representative of, for example, various portable computing devices such as cellular phones, smartphones, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications.

In the illustrated implementation, the electronic device 900 includes a housing (or "case") 902 within which various circuits, sensors and other electrical components may be disposed. In the illustrated implementation, the electronic device 900 also includes a display (that may be referred to herein as a "touchscreen display" or a "touch-sensitive display") 904. The display 904 may generally be representative of any of a variety of suitable display types that employ any of a variety of suitable display technologies. For example, the display 904 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The electronic device 900 may include various other devices or components for interacting with, or otherwise communicating information to or receiving information from, a user. For example, the electronic device 900 may include one or more microphones 906, one or more speakers 908, and in some cases one or more at least partially mechanical buttons 910. The electronic device 900 may include various other components enabling additional features such as, for example, one or more video or still-image cameras 912, one or more wireless network interfaces 914 (for example, Bluetooth, WiFi or cellular) and one or more non-wireless interfaces 916 (for example, a universal serial bus (USB) interface or an HDMI interface).

The electronic device 900 may include an ultrasonic sensing system 918 capable of imaging an object signature, such as a fingerprint, palm print or handprint. In some implementations, the ultrasonic sensing system 918 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 918 may function both as a user input button to control the electronic device 900 as well as a sensor to enable security features such as user authentication based on, for example, a fingerprint, palm print or handprint.

Figure 10A:
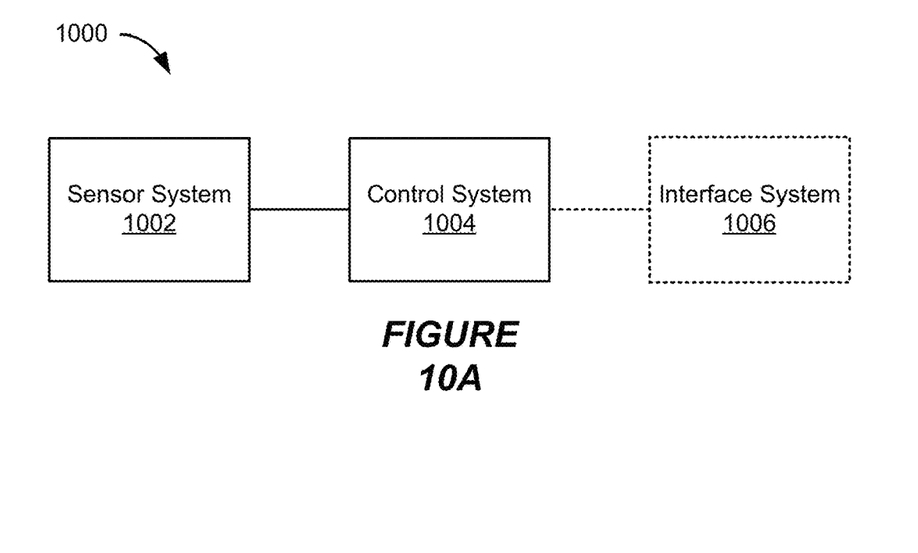
FIG. 10A shows a block diagram representation of components of an example of an ultrasonic sensing system, according to some implementations.

FIG. 10A shows a block diagram representation of components of an example of an ultrasonic sensing system, according to some implementations. In the illustrated implementation, an ultrasonic sensing system 1000 includes a sensor system 1002 and a control system 1004 electrically coupled with the sensor system 1002. The sensor system 1002 may be capable of scanning a target object and providing raw measured image data usable to obtain an object signature of, for example, a human appendage, such as one or more fingers or toes, a palm, hand or foot. The control system 1004 may be capable of controlling the sensor system 1002 and processing the raw measured image data received from the sensor system 1002. In some implementations, the ultrasonic sensing system 1000 may include an interface system 1006 capable of transmitting or receiving data, such as raw or processed measured image data, to or from various components within or integrated with the ultrasonic sensing system 1000 or, in some implementations, to or from various components, devices or other systems external to the ultrasonic sensing system 1000.

Figure 10B:
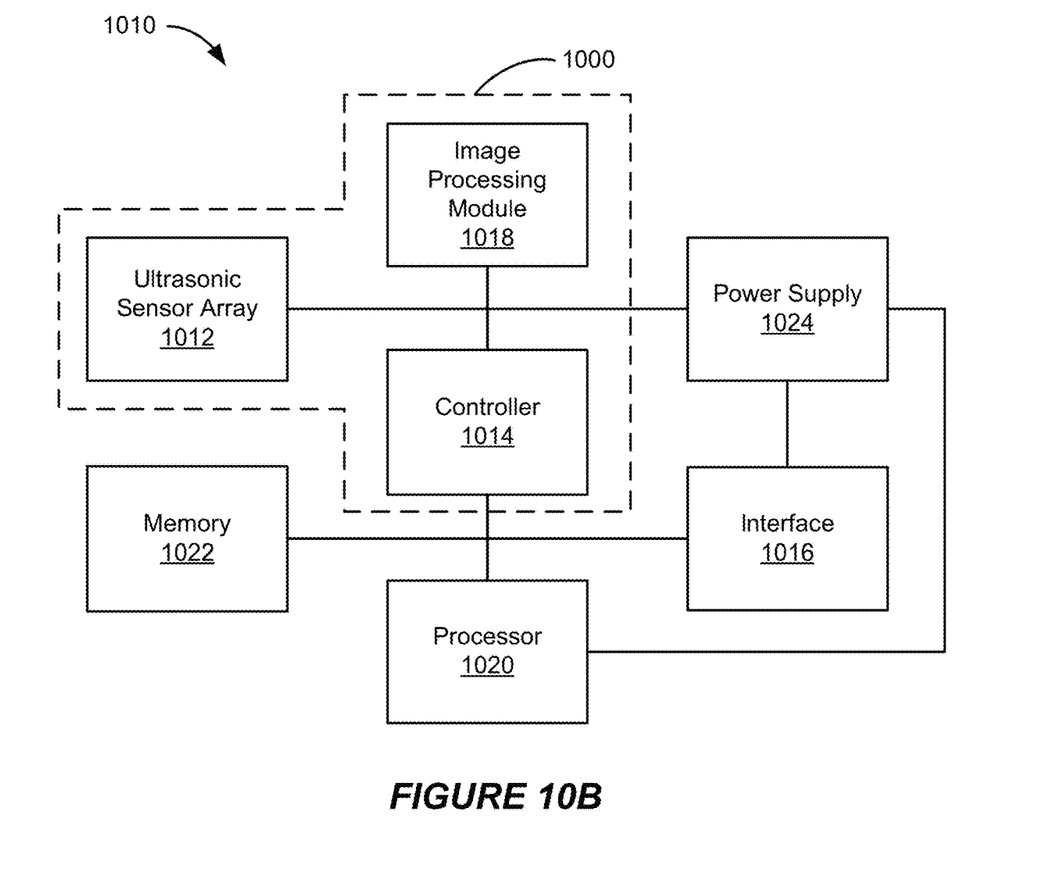
FIG. 10B shows a block diagram representation of components of an example of an electronic device, according to some implementations.

FIG. 10B shows a block diagram representation of components of an example of an electronic device, according to some implementations. In the illustrated example, an electronic device 1010 includes the ultrasonic sensing system 1000 of FIG. 2A. For example, the electronic device 1010 may be a block diagram representation of the electronic device 900 shown in and described with reference to FIG. 9 above. The sensor system 1002 of the ultrasonic sensing system 1000 of the electronic device 1010 may be implemented with an ultrasonic sensor array 1012. The control system 1004 of the ultrasonic sensing system 1000 may be implemented with a controller 1014 that is electrically coupled with the ultrasonic sensor array 1012. While the controller 1014 is shown and described as a single component, in some implementations, the controller 1014 may collectively refer to two or more distinct control units or processing units in electrical communication with one another. In some implementations, the controller 1014 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 1000 of FIG. 2B may include an image processing module 1018. In some implementations, raw measured image data provided by the ultrasonic sensor array 1012 may be sent, transmitted, communicated or otherwise provided to the image processing module 1018. The image processing module 1018 may include any suitable combination of hardware, firmware and software configured, adapted or otherwise operable to process the image data provided by the ultrasonic sensor array 1012. In some implementations, the image processing module 1018 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 1014, for example, where the controller 1014 is implemented as a system-on-chip (SoC) or system-in-package (SIP). In some implementations, one or more of such circuits or circuit components may be integrated within a DSP included within or coupled with the controller 1014. In some implementations, the image processing module 1018 may be implemented at least partially via software. For example, one or more functions of, or operations performed by, one or more of the circuits or circuit components just described may instead be performed by one or more software modules executing, for example, in a processing unit of the controller 1014 (such as in a general purpose processor or a DSP).

In some implementations, in addition to the ultrasonic sensing system 1000, the electronic device 1010 may include a separate processor 1020, a memory 1022, an interface 1016 and a power supply 1024. In some implementations, the controller 1014 of the ultrasonic sensing system 1000 may control the ultrasonic sensor array 1012 and the image processing module 1018, and the processor 1020 of the electronic device 1010 may control other components of the electronic device 1010. In some implementations, the processor 1020 communicates data to the controller 1014 including, for example, instructions or commands. In some such implementations, the controller 1014 may communicate data to the processor 1020 including, for example, raw or processed image data. It should also be understood that, in some other implementations, the functionality of the controller 1014 may be implemented entirely, or at least partially, by the processor 1020. In some such implementations, a separate controller 1014 for the ultrasonic sensing system 1000 may not be required because the functions of the controller 1014 may be performed by the processor 1020 of the electronic device 1010.

Depending on the implementation, one or both of the controller 1014 and processor 1020 may store data in the memory 1022. For example, the data stored in the memory 1022 may include raw measured image data, filtered or otherwise processed image data, estimated PSF or estimated image data, and final refined PSF or final refined image data. The memory 1022 may store processor-executable code or other executable computer-readable instructions capable of execution by one or both of the controller 1014 and the processor 1020 to perform various operations (or to cause other components such as the ultrasonic sensor array 1012, the image processing module 1018, or other modules to perform operations), including any of the calculations, computations, estimations or other determinations described herein (including those presented in any of the equations below). It should also be understood that the memory 1022 may collectively refer to one or more memory devices (or "components"). For example, depending on the implementation, the controller 1014 may have access to and store data in a different memory device than the processor 1020. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 1014 or the processor 1020 may communicate data stored in the memory 1022 or data received directly from the image processing module 1018 through the interface 1016. For example, such communicated data can include image data or data derived or otherwise determined from image data. The interface 1016 may collectively refer to one or more interfaces of one or more various types. In some implementations, the interface 1016 may include a memory interface for receiving data from or storing data to an external memory such as a removable memory device. Additionally or alternatively, the interface 1016 may include one or more wireless network interfaces or one or more wired network interfaces enabling the transfer of raw or processed data to, as well as the reception of data from, an external computing device, system or server.

The power supply 1024 may provide power to some or all of the components in the electronic device 1010. The power supply 1024 may include one or more of a variety of energy storage devices. For example, the power supply 1024 may include a rechargeable battery, such as a nickel-cadmium battery or a lithium-ion battery. Additionally or alternatively, the power supply 1024 may include one or more supercapacitors. In some implementations, the power supply 1024 may be chargeable (or "rechargeable") using power accessed from, for example, a wall socket (or "outlet") or a photovoltaic device (or "solar cell" or "solar cell array") integrated with the electronic device 1010. Additionally or alternatively, the power supply 1024 may be wirelessly chargeable.

As used hereinafter, the term "processing unit" refers to any combination of one or more of a controller of an ultrasonic system (for example, the controller 1014), an image processing module (for example, the image processing module 1018), or a separate processor of a device that includes the ultrasonic system (for example, the processor 1020). In other words, operations that are described below as being performed by or using a processing unit may be performed by one or more of a controller of the ultrasonic system, an image processing module, or a separate processor of a device that includes the ultrasonic sensing system.

Thus, an improved ultrasonic sensor array has been disclosed. It will be appreciated that a number of alternative configurations and fabrication techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as a person having ordinary skill in the art will readily appreciate, the terms "upper" and "lower", "top" and "bottom", "front" and "back", and "over", "overlying", "on", "under" and "underlying" are sometimes used for ease of describing the figures and indicate relative positions corresponding to the orientation of the figure on a properly oriented page, and may not reflect the proper orientation of the device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

What is claimed is:

1. An ultrasonic sensor array comprising:
    a plurality of ultrasonic transducers, each transducer including a piezoelectric member, wherein:
        (a) each of the transducers includes an electret member;
        (b) each of the transducers includes a receive (Rx) layer configured to exhibit a first d33 resonating mode coefficient and a transmit (Tx) layer configured to exhibit a second d33 resonating mode coefficient, the first coefficient being different from the second coefficient; and
        (c) the transducers are disposed on a flexible substrate.

2. The ultrasonic sensor array of claim 1, wherein the array includes each of (a), (b) and (c).

3. The ultrasonic sensor array of claim 1, wherein the electret member is composed of a flouropolymer.

4. The ultrasonic sensor array of claim 1, wherein the Tx layer includes the piezoelectric member and the Rx layer includes the electret member.

5. The ultrasonic sensor array of claim 1, wherein the first d33 resonating mode coefficient is of opposite sign with respect to the second d33 resonating mode coefficient.

6. The ultrasonic sensor array of claim 1, wherein the array further comprises a flexible electronics layer, the electret member being configured to be flexible.

7. The ultrasonic sensor array of claim 6, wherein the flexible electronics layer is a flexible organic light-emitting diode display.

8. The ultrasonic sensor array of claim 1, wherein the piezoelectric member is formed from a ferroelectric.

9. The ultrasonic sensor array of claim 1, wherein the piezoelectric member is formed from a copolymer.

10. The ultrasonic sensor array of claim 1, wherein at least some of the plurality of transducers are electrically connected in series.

11. The ultrasonic sensor array of claim 1, wherein the array has a surface area of 10 in$^2$ or greater.

12. A method of forming an ultrasonic transducer, the method comprising:
    forming a receive (Rx) layer;
    forming a transmit (Tx) layer; and
    coupling the Rx layer with the Tx layer; wherein:
        the ultrasonic transducer is disposed on a flexible substrate and includes an electret member; and
        the Rx layer is configured to exhibit a first d33 resonating mode coefficient and the Tx layer is configured to exhibit a second d33 resonating mode coefficient, the first coefficient being different from the second coefficient.

13. The method of claim 12, wherein the electret member is composed of a fluoropolymer.

14. The method claim 12, wherein the Tx layer includes a piezoelectric member.

15. The method of claim 14 wherein the piezoelectric member is formed from a ferroelectric.

16. The method of claim 14 wherein the piezoelectric member is formed from a copolymer.

17. The method of claim 12, wherein the first d33 coefficient is of opposite sign with respect to the second d33 coefficient.

18. An ultrasonic sensor array comprising:
    a plurality of ultrasonic transducers, each transducer including an electret member, wherein:
        each of the transducers includes a piezoelectric member;
        each of the transducers includes a receive (Rx) layer configured to exhibit a first d33 resonating mode coefficient and a transmit (Tx) layer configured to exhibit a second d33 resonating mode coefficient, the first coefficient being different from the second coefficient; and
        the transducers are disposed on a flexible substrate.

19. The ultrasonic sensor array of claim 18, wherein the electret member is configured to be an acoustic transducer.

20. The ultrasonic array of claim 18, wherein the piezoelectric member is composed of a ferroelectric.

21. The ultrasonic array of claim 18, wherein the piezoelectric member is composed of a copolymer.

22. The ultrasonic array of claim 18, wherein the Tx layer includes the piezoelectric member and the Rx layer includes the electret member.

23. The ultrasonic array of claim 18, wherein the first d33 resonating mode coefficient is of opposite sign with respect to the second d33 resonating mode coefficient.

24. The ultrasonic array of claim 18, wherein the array further comprises a flexible electronics layer, the electret member being configured to be flexible.

25. The ultrasonic array of claim 24, wherein the flexible electronics layer is a flexible organic light-emitting diode display.

26. The ultrasonic sensor array of claim 18, wherein at least some of the plurality of transducers are electrically connected in series.

27. The ultrasonic array of claim 18, wherein the array has a surface area of 10 in$^2$ or greater.

28. The ultrasonic sensor array of claim 1, wherein the first d33 resonating mode coefficient and the second d33 resonating mode coefficient correspond to a mode of excitation in which an electrical signal applied in a first direction across a dimension T results in resonating oscillations in the first direction.

29. The ultrasonic sensor array of claim 28, wherein the first d33 resonating mode coefficient and the second d33 resonating mode coefficient correspond to frequency response characteristics related to dimension T.

* * * * *